A. KUEFER.
UNIT OF POWER TRANSMISSION.
APPLICATION FILED JAN. 11, 1917.

1,241,741.

Patented Oct. 2, 1917.
3 SHEETS—SHEET 1.

Inventor:
Anthony Kuefer.

A. KUEFER.
UNIT OF POWER TRANSMISSION.
APPLICATION FILED JAN. 11, 1917.
1,241,741.
Patented Oct. 2, 1917.
3 SHEETS—SHEET 2.
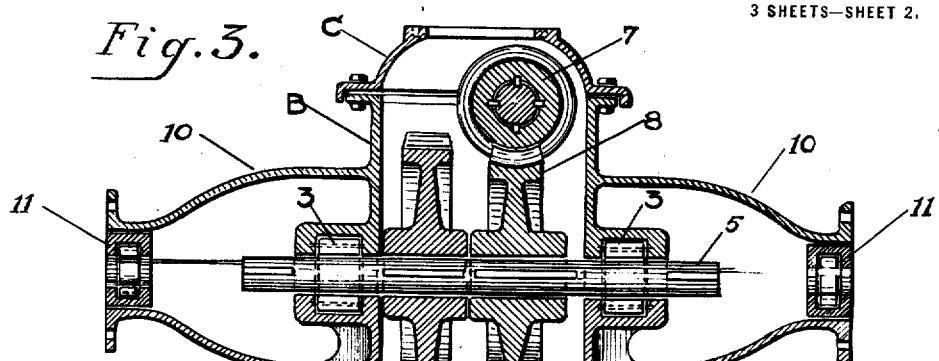
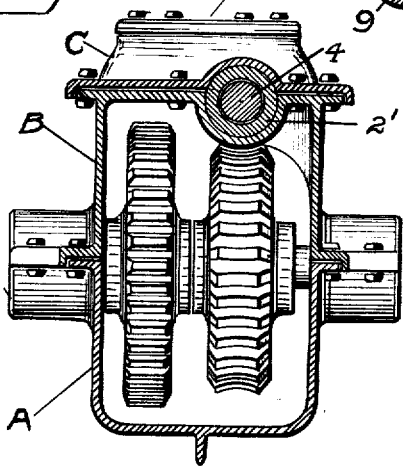
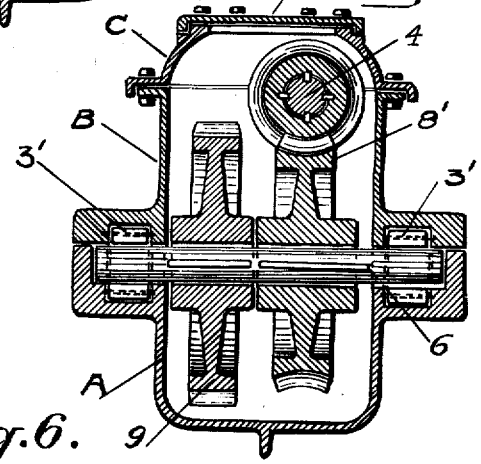
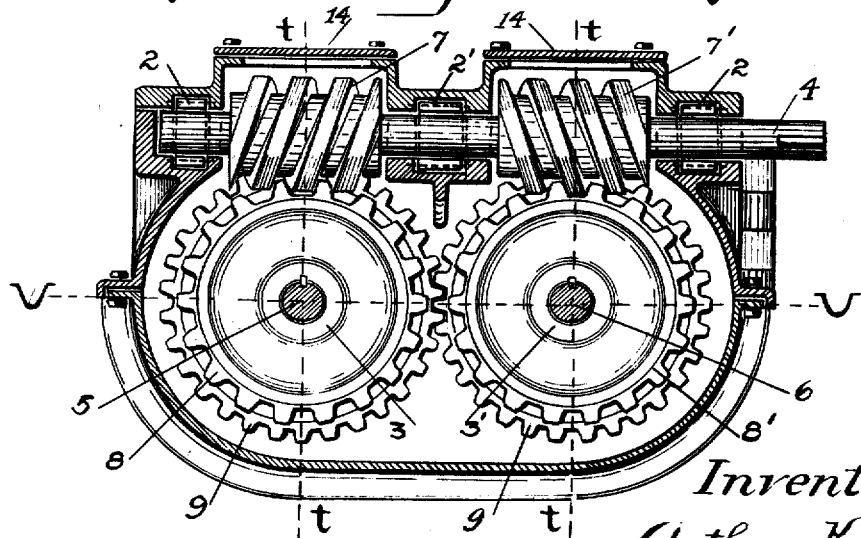
Inventor:
Anthony Kuefer.

A. KUEFER.
UNIT OF POWER TRANSMISSION.
APPLICATION FILED JAN. 11, 1917.

1,241,741.

Patented Oct. 2, 1917.
3 SHEETS—SHEET 3.

Inventor:
Anthony Kuefer
by Robt. D. Wilson
his Attorney

UNITED STATES PATENT OFFICE.

ANTHONY KUEFER, OF TOLEDO, OHIO, ASSIGNOR TO ROBERT B. WILSON, TRUSTEE.

UNIT OF POWER TRANSMISSION.

1,241,741.        Specification of Letters Patent.        Patented Oct. 2, 1917.

Application filed January 11, 1917. Serial No. 141,756.

*To all whom it may concern:*

Be it known that I, ANTHONY KUEFER, a citizen of the United States, residing at Toledo, in the county of Lucas and State of Ohio, have invented new and useful Improvements in Units of Power Transmission, of which the following is a specification.

My invention relates to a balanced unit of power transmission.

In application Serial No. 73576, filed January 26, 1916, I have shown and described a unit of the kind that is adapted among other things, as a drive for various mechanisms, wherever it is desired to divisionally transmit the power of a driving shaft equally in opposite directions, through a pair of parallel shafts, each adapted to be severally connected at either end to different parts to be driven, and equally divide between the two shafts the loads of both, however the loads of each may differ.

My present invention has for its object to provide a balanced unit of the kind, whereby the power of the driving shaft is transmitted in either of opposite directions to a second shaft extending transversely to the line of the driving shaft and having each end adapted to be connected to different parts to be driven, and a third shaft parallel with the second shaft, said third shaft being auxiliary to the second and adapted to receive one half the power of the driving shaft and carry one half of the load of said first shaft.

A further object is to produce as an article of manufacture a unit of the kind described, that is self-contained between the driving and driven parts of various mechanisms, and whereby the power is transmitted from the driving to the driven parts with a minimum loss by friction and with greatly reduced wear of the connecting parts.

A further object is to provide an efficient unit of the kind and for the purpose wherein a shaft extending longitudinally through the top portion of an elongated casing, and journaled in alined bearings of the casing is connected to a second shaft extending transversely through the casing below said first shaft, and with an auxiliary shaft journaled within the casing parallel with said second shaft, by two equal opposed worms fixedly mounted on said first shaft and meshing respectively, each with one or two equal opposed worm wheels, fixedly mounted, one on said second shaft, and the other on said auxiliary shaft within the casing, and wherein said second shaft and the said auxiliary shaft are connected with each other by a pair of equal intermeshing spur gear wheels fixedly and independently mounted, one on said second and the other on said auxiliary shaft within the casing and whereby the end thrusts of the worms are balanced and neutralized, the load, the strain, and the wear are equally divided and balanced between like parts, and the friction of the whole unit relatively to the power transmitted and the load is greatly reduced, and whereby also the said first and second shafts may be interchangeably used as the driving or the driven shaft.

I accomplish these objects by the construction and combination of parts as hereinafter described and illustrated in the drawings, in which—

Fig. 3 is a cross section of Fig. 1 on line *x—x*.

Fig. 4 is a cross section of Fig. 1 on line *y—y*.

Fig. 5 is a cross section of Fig. 1 on line *z—z*.

Fig. 6 is a horizontal section of Fig. 2 on line *w—w*.

Figure 1:
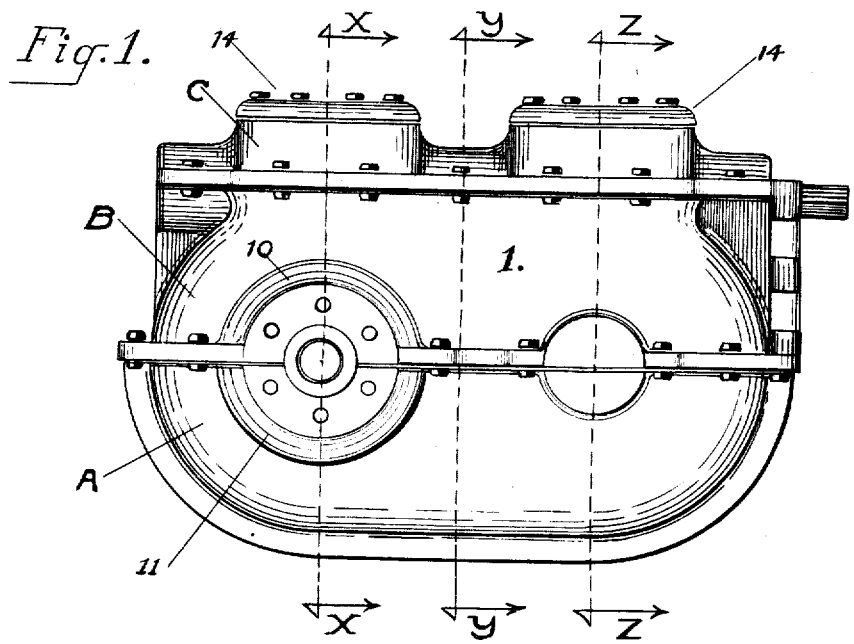
Figure 1 is a side elevation of a power transmission unit constructed in accordance with my invention.
Figure 2:
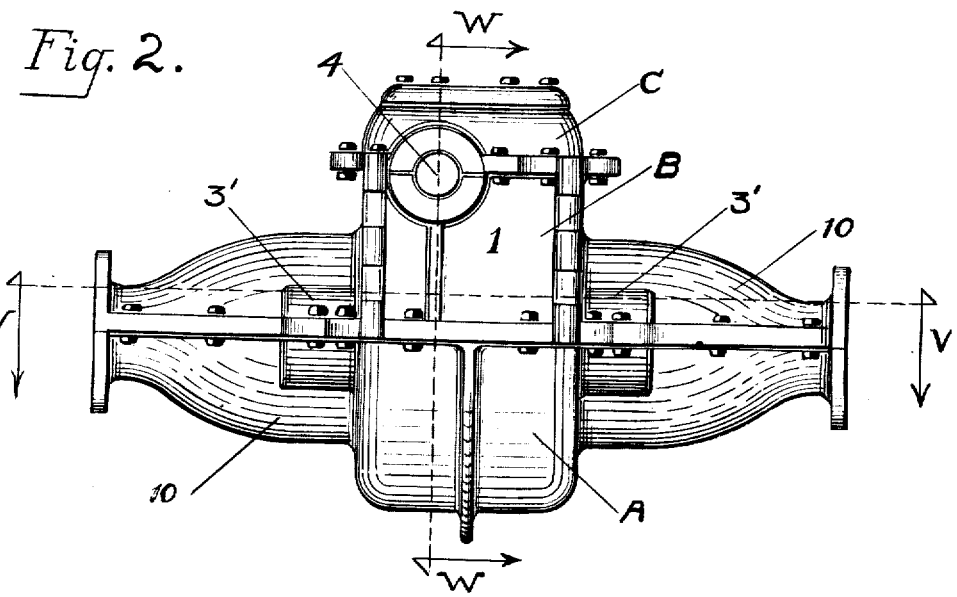
Fig. 2 is a front end elevation of the same.
Figure 7:
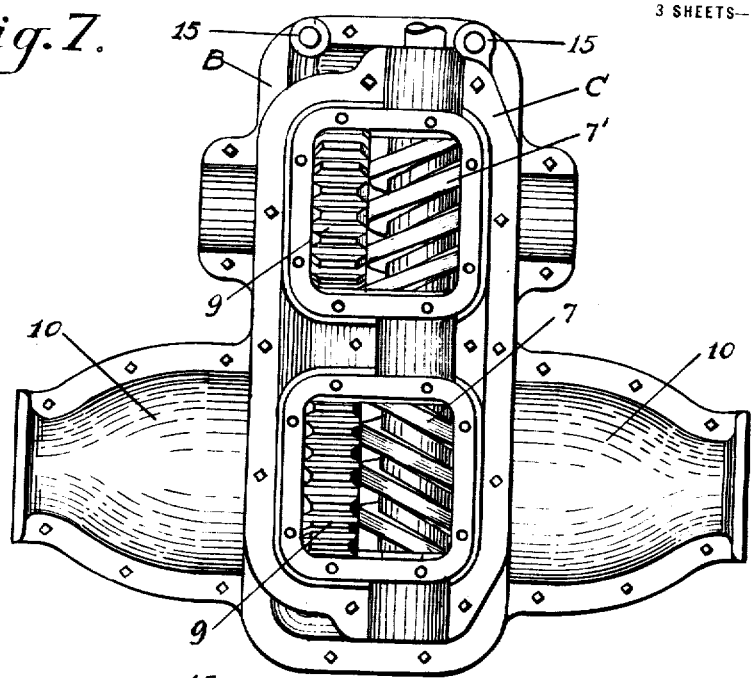
Fig. 7 is a top view of the unit with the detachable plates removed, and—
Figure 8:
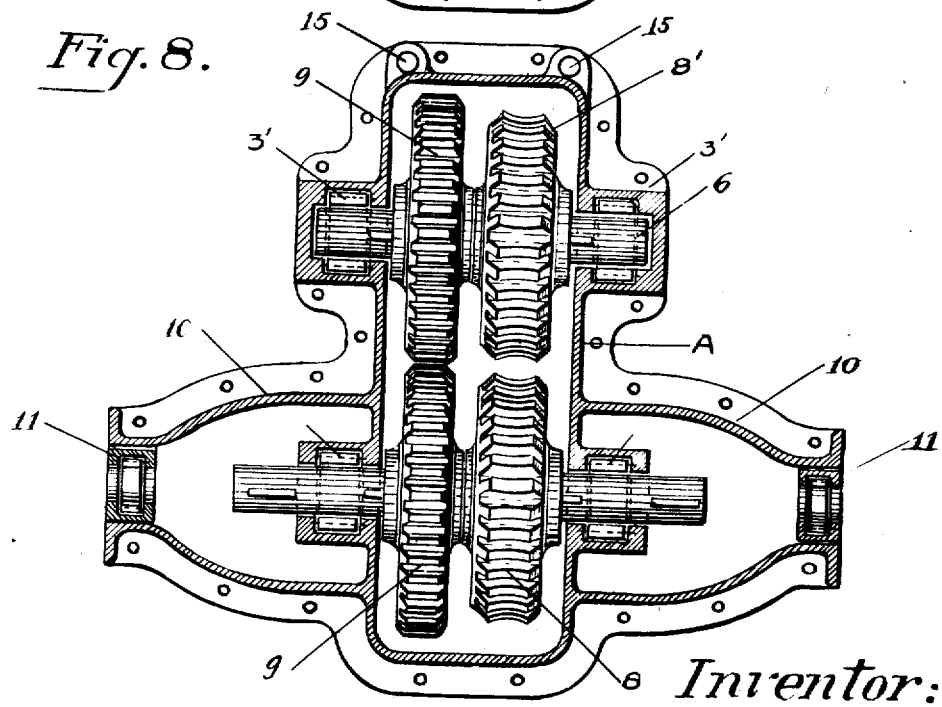
Fig. 8 is a horizontal section of Fig. 2 on line *v—v*.

In the drawings 1 designates an oblong casing having parallel sides rounding into the rounded ends, top and bottom, at the corners, and comprising the lower section A, the middle section B, and the top section C, dividing the casing longitudinally and horizontally.

Along the division lines of the walls of the casing 1 the sections are provided with complementary perforated flanges by which the sections are suitably and firmly bolted together, the upper flange of each joint being recessed to receive the lower flange thereof with a packing gland between, to render the joints oil tight and to secure accuracy of adjustment of the sections one to the other.

At their ends the sections B and C have preferably formed with their respective joint flanges the lower and upper halves respectively of recesses to receive and aline the cylindrical boxing of roller bearings 2. But it is to be understood that instead of recesses the ordinary forms of shaft bearings may be provided.

Centrally between the ends of the casing 1, the side flanges of the sections B and C forming the joint between those sections are provided respectively, the flanges of the section B with the integral lower half of the central shaft bearing 2′ in position bridging the top of the section B, and the section C with a central bridge integrally spanning between its sides and having formed on its under side the upper half of said bearing 2′.

The casing 1 is also provided with the bearings 3 and 3′, which are respectively in pairs alined transverse the sides of the casing and have their centers in the joint of the sections A and B at points equi-distant from the ends and center of the side joints, and the bearings 3 and 3′ are also preferably roller bearings, the cylindrical boxes of which are let into recesses formed in projecting bosses 4 and 4′ formed integral with the flanges of the joint between the sections A and B. But it is to be understood that the bearings 3 and 3′ may be of the ordinary type of shaft bearings instead.

However, whichever type of bearing is used, the bearings 3 are open at the outer ends for the projection of a shaft and the bearings 3′ are closed at their outer ends.

The bearing 2 at the rear end of the casing is also preferably closed at the outer end, and the bearing 2 at the front end of the casing is open for the projection of one end of a shaft.

In the end bearings 2 and central bearings 2′ is journaled a shaft 4 having its front end portion projecting from the casing and adapted to be coupled to a driving power.

In the bearings 3 is journaled a shaft 5, which has its end portions projecting beyond the bearings and adapted to be coupled to parts to be driven thereby.

In the bearings 3′ is journaled within the casing an auxiliary shaft 6.

On the shaft 4 between the bearings 2 and 2′ is fixedly mounted the equal opposed worms 7 and 7′, one right and one left hand threaded.

Fixedly mounted on the shafts 5 and 6 respectively and meshing with the worms 7 and 7′ respectively are the equal opposed worm wheels 8 and 8′, and connecting the shaft 5 and the auxiliary shaft 6 is a pair of equal intermeshing spur gears 9, fixedly and independently mounted, one on the shaft 5 and the other on the shaft 6, in fixed time relation with the worms and worm wheels.

At the rear end of the casing 1 the section A is provided with the lower half portions of side projections 10, semi-cylindrical at the inner ends and extending opposite concentric to the lower halves of the bearings 3, and the joint flange of the section A is extended along the top of the sides of the projections. The section B above the bearings 3 is provided with the upper halves of the side projections 10, having joint flanges complementary to the joint flanges of the lower halves to which they are secured by bolts through the joint flanges.

At the outer ends of the projections 10 are provided bearings 11 suitable for journaling in alinement with the shaft 5, shafts that are connected to its ends.

Thus constructed the parts are assembled as follows:—

A worm wheel and a spur gear are fixedly mounted on the shaft 5 so that a horizontal line transversely through the axis of the shaft will pass central between two teeth of the spur gear of the auxiliary shaft, and a vertical line through the worm wheel will pass through the axis of the shaft 5 and central between the teeth of the worm wheel, as shown in Fig. 6.

A worm wheel and a spur gear wheel are fixedly mounted on the shaft 6 so that a horizontal line through the axis of the shaft 6 will pass centrally and radially through a tooth of the spur gear wheel of that shaft, that is nearest the shaft 5 and a vertical line through the axis of the shaft 6 and the worm wheel 7′ will pass radially and centrally through the space between two teeth of the worm wheel, as shown in Fig. 6.

Thus assembled on the shafts 5 and 6 the horizontal space of the spur gear 9 of the shaft 5 and vertical space of the worm wheel 8 of the same shaft are marked for identification. In like manner the horizontal tooth of the spur gear 9 and the vertical space between two teeth of the worm wheel 8′ of the shaft 6 are marked so that when the shafts 5 and 6 are assembled in the bearings 3 and 3′ of the section A, with the marked tooth of the spur gear 9 of the shaft 6 in the marked horizontal space of the spur gear 9 of the shaft 5, the marked spaces of the worm gear 8 of the shaft 5 and the marked space of the worm gear 8′ of the shaft 6 will be vertical above the axes of their respective shafts.

With the shafts 5 and 6 thus assembled, the section B is secured to section A, and the shaft 4 with the worms 7 and 7′ adjustably mounted thereon is placed in the lower halves of the bearings 2 and 2′ with the worms adjusted to bring the central spiral portion of the thread of the worm 7′ in intermeshing relation with the marked vertical space of the worm wheel 8′, and the central portion of the thread of the worm 7 in intermeshing engagement with the marked vertical space of the worm wheel 8 of the shaft 5. In this relation, the worms are suitably fixed on the shaft 4 and the top section 8 being bolted to the section B, the unit is complete.

Preferably the section C is provided at the top with the detachable plates 14 which permit inspection of the interior of the casing and the introduction of lubricant without the necessity of removing the whole of the section C, and it will be seen that lubricant in the bottom portion of the section A will lubricate all parts of the gear.

At the front end of section B of casing 1 the section is provided with a suitable projection 15 which is extended forward of the bearings 2 and made adapted as a support for the front end of the casing. and the projections 10 are also available as supports for the rear end, according as the nature of its use as a unit requires.

Thus constructed, when the power is connected to the protruding end portion of the shaft 4, the power is transmitted equally by the worms 7 and 7' to the worm wheels 8 and 8' thereby revolving the main shaft 5 and the auxiliary shaft 6 in opposite directions, at equal speeds, whatever the direction of revolution of the shaft 4, and the meshing spur gears 9 connecting the shafts operate, 1st., to transmit the power of the auxiliary shaft 6 to the main shaft 5 in the direction of the revolution of the latter, whereby it receives the whole of the power of the shaft 4; 2nd. the spur gears 9 operate to transmit from the shaft 5 one half of its load to the auxiliary shaft 6, whereby the strain of the load and the wear of the parts is equally divided between the shafts 5 and 6 and is also equalized and distributed between the worms, worm wheels and spur gears respectively whereby the life of the whole gearing is greatly prolonged; and 3rd., the gears 9 operate to transmit the end thrust of the worms 7 and 7' driving the respective shafts 5 and 6 each to the other of them in opposition to the end thrust of such other worm, whereby the end thrust of each worm is counterbalanced and neutralized, and each worm is also made to assist the other of them in its rotary thrust, whereby the use of end thrust bearings are unnecessary, and their friction and wear is wholly avoided and the friction of the gearing is otherwise greatly reduced, and whereby the unit is made adapted to have power applied to the shaft 5 and drive the worm shaft 4, a result that is impossible with any single worm drive and which shows the great comparative reduction in friction of my present worm drive over the single worm drive in common use.

It is apparent that the unit constructed as described is adapted to be conveniently and effectively used with various mechanisms wherever transmission of power at right angles to the source of power is desired.

While the form of three part casing shown and described is preferred, it is manifest that it may be divided into a greater or less number of parts, and still make it practical to assemble the parts of the gear in their essential relation as described, I therefore in providing a casing for the gearing, do not limit myself otherwise than is expressed in the claims.

What I claim to be new is—

1. An article of manufacture adapted to be utilized as a unit to drive different mechanisms, comprising an inclosing casing, a single driving shaft extending lengthwise of the casing, and having a protruding end for connection with a source of power, opposed worms carried by said shaft within the casing, parallel shafts extending laterally one through and the other within the casing, an end of said first parallel shaft protruding for connection with a part to be driven, worm gears carried by said parallel shafts within the casing and meshing with the worms of the driving shaft, and a pair of spur gears also carried by and independently mounted on said parallel shafts within the casing and meshing with each other, whereby the gears are balanced and end thrust is neutralized.

2. An article of manufacture adapted to be utilized as a unit to drive different mechanisms, comprising an inclosing casing, a single shaft extending lengthwise in the upper portion of the casing and having a protruding end portion for connection, a pair of opposed worms carried by said shaft within the casing, parallel shafts extending laterally, one through and the other within the lower portion of the casing, the ends of said first parallel shaft protruding for connection, interchangeably with the protruding portion of said worm carrying shaft, with the source of power and with the parts to be driven, a pair of opposed worm gears carried by said parallel shafts within the casing and meshing with the worms of said worm shaft, and a pair of spur gears also carried by and independently mounted on said parallel shafts within the casing, and meshing with each other, whereby the gears are balanced and end thrust is neutralized.

3. An article of manufacture adapted to be utilized as a unit to drive different mechanisms, comprising an inclosing casing, a single shaft extending lengthwise of the upper portion of the casing and having a protruding end portion for connection, a pair of opposed worms carried by said shaft within the casing, parallel shafts extending laterally, one through and the other within the lower portion of the casing, the ends of said first parallel shaft protruding for connection, a pair of worm gears carried by said parallel shafts within the casing and meshing with the worms of said first shaft, and a pair of spur gears also carried by said parallel shafts within the casing and meshing with each other, whereby the gears are balanced and end thrust is neutralized, the connecting end portion of said first shaft and either of the protruding end portions of said parallel shaft being adapted to be interchangeably connected, one with a driver and the other with a part to be driven.

In testimony whereof I have hereunto set my hand at Toledo, Ohio, this 6th day of January, 1917.

ANTHONY KUEFER.

In presence of—
ALBERT T. GOORLEY.